(12) United States Patent
Frank

(10) Patent No.: US 6,256,070 B1
(45) Date of Patent: Jul. 3, 2001

(54) CONCURRENT DISCRETE TIME OSCILLATORS (DTO) FOR VIDEO AND CLOSED CAPTION ENCODING

(75) Inventor: Michael Frank, Newtown, PA (US)

(73) Assignee: Ati International Srl, Christ Church (BB)

(*) Notice: Subject to any disclaimer, the term of this patent is extended or adjusted under 35 U.S.C. 154(b) by 0 days.

(21) Appl. No.: 09/170,519

(22) Filed: Oct. 13, 1998

Related U.S. Application Data

(63) Continuation-in-part of application No. 09/126,971, filed on Aug. 3, 1998.

(51) Int. Cl.[7] .............................. H04N 7/08; H04N 9/74
(52) U.S. Cl. .................. 348/473; 348/468; 348/475; 348/589; 348/486
(58) Field of Search .................................. 348/468, 473, 348/475, 589, 600, 469, 486; H04N 7/08, 9/74

(56) References Cited

U.S. PATENT DOCUMENTS 5,801,782 * 9/1998 Patterson ............................ 348/473

* cited by examiner

*Primary Examiner*—Sherrie Hsia
(74) *Attorney, Agent, or Firm*—Vedder, Price, Kaufman & Kammholz

(57) ABSTRACT

A video encoding system combines the processing of image data and closed caption data in the formation of a raster television signal. By combining the processing of image data and closed caption data, a single discrete time oscillator (DTO) can be used to generate oscillation signals that are required for each process. In a preferred embodiment, the DTO generates the 500 kHz signal that is used as the "run in" clock for closed caption data, and also generates the subcarrier signal that is used for the modulation of the chrominance components of a composite video signal.

25 Claims, 5 Drawing Sheets

FIG. 1 [Prior Art]

CONCURRENT DISCRETE TIME OSCILLATORS (DTO) FOR VIDEO AND CLOSED CAPTION ENCODING

RELATED APPLICATIONS

This is a continuation in part of co-pending application entitled "A Systolic Video Encoding System," filed by Michael Frank, having a Ser. No. of 09/126,971, a filing date of Aug. 3, 1998, and assigned to the same assignee as the present invention.

TECHNICAL FIELD OF THE INVENTION

The invention relates generally to video image encoding and more particularly to the encoding of raster images with closed captioning.

BACKGROUND OF THE INVENTION

Conventional television receiving systems conform to standards, such as NTSC and PAL, which have evolved since the initiation of television broadcasting. Since these standards evolved over time, they include, for example, modulation schemes that allow for the transmission of color images without adversely affecting the reception and reproduction of these images on televisions that are only capable of displaying images in black and white. These standards also include the encoding of closed caption information within each frame, also formatted so as not to adversely affect the reception and reproduction of images on televisions that are not capable of displaying closed caption text.

Standards, such as SMPTE 125 and CCIR 601, have been developed for the digital production, storage, and display of images that are substantially compatible with the display of images using NTSC and PAL rasterizing techniques, albeit at higher resolution. These standards address the number of lines per screen image (vertical resolution), the number of digital samples per line (horizontal resolution), and the number of bits per digital sample. The encodings provided by these standards are baseband encodings, and do not include, for example, the modulations that are applied for conventional NTSC or PAL raster encodings with embedded closed caption information. To communicate a digital encoding of image data to a conventional television receiver, the image data must be modulated to conform to the conventional television broadcast conventions, as defined for example by the FCC. That is, the FCC has allocated a maximum of 6 MHz for a television channel transmission and has requested the color information, or chrominance, to be quadrature-phase modulated about a chrominance subcarrier frequency at 3.58 MHz. The FCC has also requested the audio information to be frequency modulated about a sound center frequency at 4.5 MHz and the closed caption information to be contained on lines 21 and 284 of the channel transmission, preceded by a clocking signal of approximately 500 kHz. These frequencies are specific for the North American NTSC standard and are different for other standards and countries.

FIG. 1 illustrates a prior art technique for encoding image data 101, closed caption data 102, and other signals 143 for communication to a conventional raster television 160. In this example, an image processing system (not shown) creates digitally encoded image data 101. The image processing system may be, for example: a computer graphics system that is used to create images; a computer system that receives images from other sources, such as the world-wide web; a digital video disc player; and the like. The aforementioned digital image standard, CCIR 601, specifies an interface clock rate of 27 MHz for the communication of image data, corresponding to the sample rate of the image data, which consists of a luminance component at 13.5 MHz, and two chrominance components at 6.25 MHz each. The video encoder 130 encodes these samples for transmission to a raster television using conventional television broadcast encoding techniques, common in the art. The video encoder 130 produces raster encoded sample data 131 that is converted into analog form by a digital to analog converter 140 to form an analog video raster signal 141.

The closed caption encoder 132 separately processes the closed caption data to form a closed caption raster signal 142 that conforms to the particular rasterization standard used. For example, in accordance with FCC standards, lines 21 and 284 of the conventional NTSC television broadcast are allocated to closed caption. The closed caption information consists of two bytes per television frame; the two bytes of closed caption information must be preceded by a 500 kHz sinusoidal clock signal. The c losed caption encoder 132 provides the 500 Hz clock signal followed by two bytes of the closed caption data 102 as the closed caption raster signal 142.

The sync control 150 mixes the analog video raster signal 141, the closed caption raster signal 142, and any other raster signals, such as modulated audio information, teletext encoded messages, and the like. The sync control 150 identifies, for example, each $21^{st}$ and $284^{th}$ line of the composite raster image, and inserts the closed caption raster signal 142 at each such line. In addition, the sync control 150 adds the appropriate synchronization signals, such as the horizontal and vertical sync pulses, to form the composite raster television signal 151 that is communicated to a conventional raster television 160.

Conventionally, the processing of each form of data 101, 102 to form components 141, 142, 143 of the raster television signal 151 is performed independently, because each form of data 101, 102 has specific and independently formulated rules and standards. For example, the processing of image data is performed on discrete data samples of the image data 101, and produces modulated samples of the raster encoded data 231. The processing of closed caption data 102, on the other hand, is primarily the appending of an analog sinusoidal signal (not shown) to a subset (two bytes) of the closed caption digital data 102. This independent processing, however, results in redundancies in the development and production of the components in each of the independent processes, thereby decreasing the efficiency of the system and increasing the costs of devices and systems used to process image data 101 and closed caption data 102.

Consequently, there exists a need for an encoding system that combines the processing of closed caption data with image data to allow for a reduction in the size or cost and improved efficiency of such a system. In particular, a need exists for the concurrent processing of closed caption data with image data to allow for the time-shared use of a discrete time oscillator (DTO) for providing the closed caption clocking signal as well as the subcarrier signal that is used to modulate the chrominance components of the image data.

DETAILED DESCRIPTION OF A PREFERRED EMBODIMENT

The disclosed video encoding system combines the processing of image data and closed caption data in the formation of a raster television signal. By combining the processing of image data and closed caption data, a single discrete time oscillator (DTO) can be used to generate oscillation signals that are required for each process. In a preferred embodiment, the DTO generates the 500 kHz signal that is used as the "run in" clock for closed caption data, and also generates the subcarrier signal that is used for the modulation of the chrominance components of a composite video signal.

Figure 1:
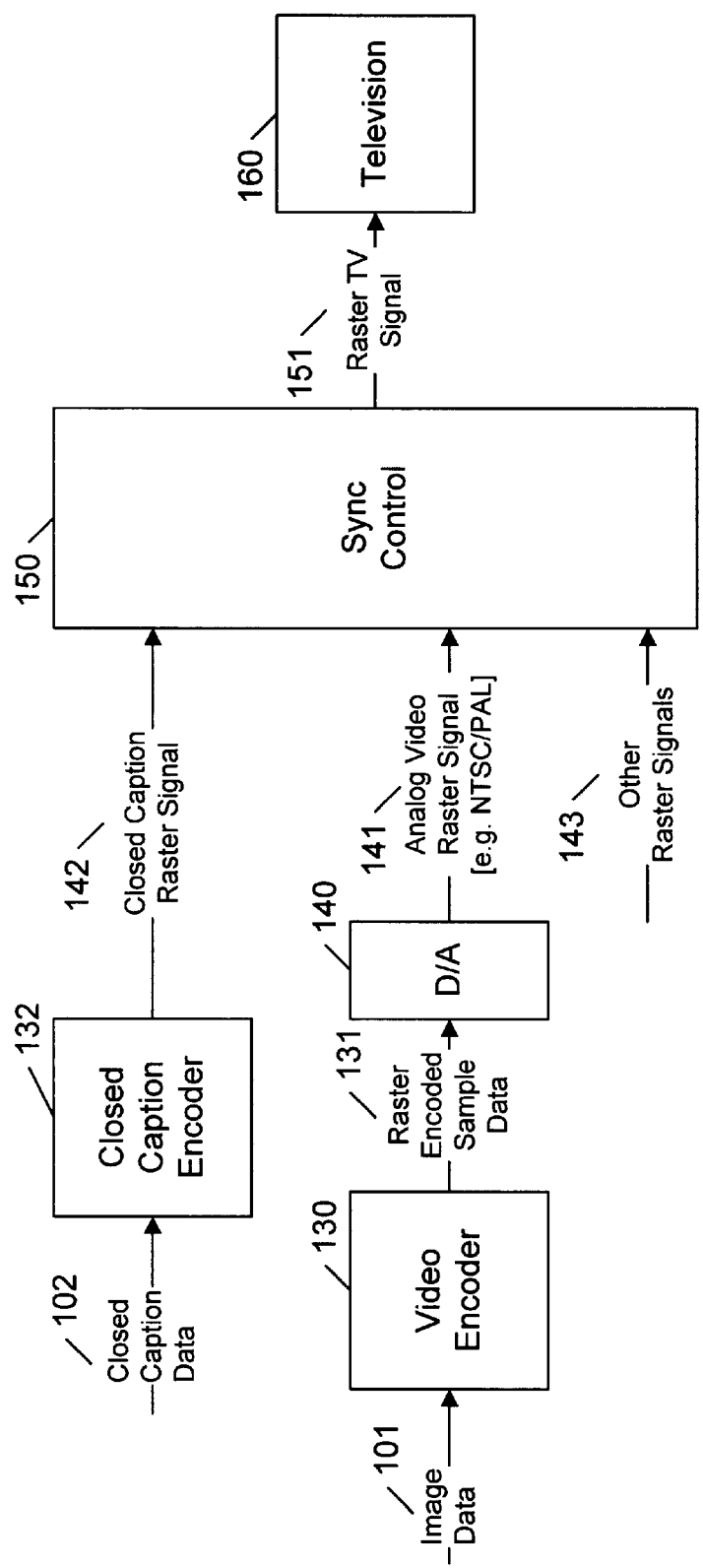
FIG. 1 illustrates an example block diagram of a prior art raster television encoding system.
Figure 2:
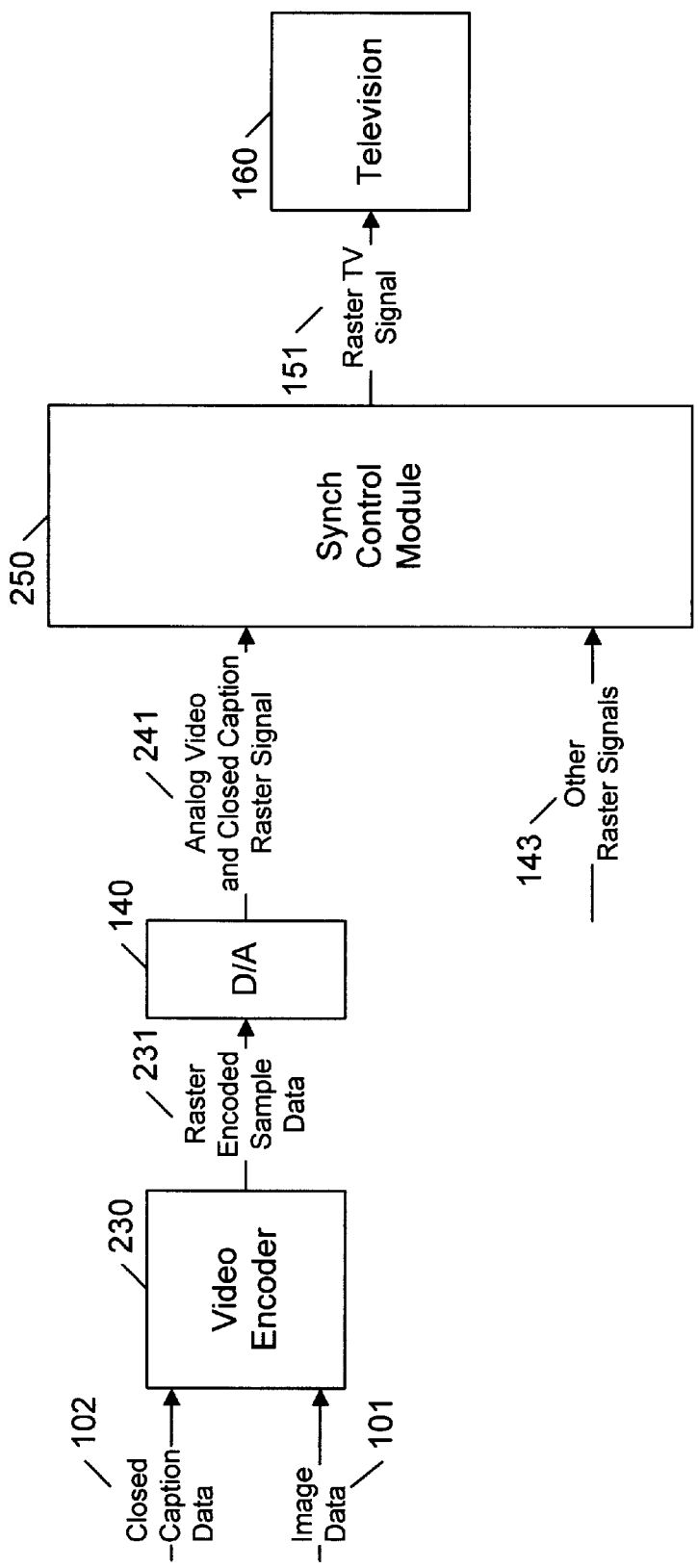
FIG. 2 illustrates an example block diagram of a video encoding system in accordance with this invention.

FIG. 2 illustrates an example block diagram of a video encoding system in accordance with the present invention. The video encoding system of FIG. 2 includes a video encoder 230, a digital to analog converter 140, and a synch control module 250. The video encoder 230 concurrently encodes image data 101 and closed caption data 102 to form raster encoded sample data 231. The video encoder 230 operates in the discrete domain and produces raster encoded sample data 231, which are discrete samples of modulated image data 101 and discrete samples of closed caption data 102 with the required 500 kHz run in clock signal. A digital to analog converter 140 converts the discrete raster encoded sample data 231 to an analog video and closed caption raster signal 241 that also contains the closed caption data and clock signaling. The sync control module 250 mixes the analog video signal 241 with the other raster signals 143 to produce a raster television signal 151 suitable for display, with closed captioning, on a television 160.

Figure 3:
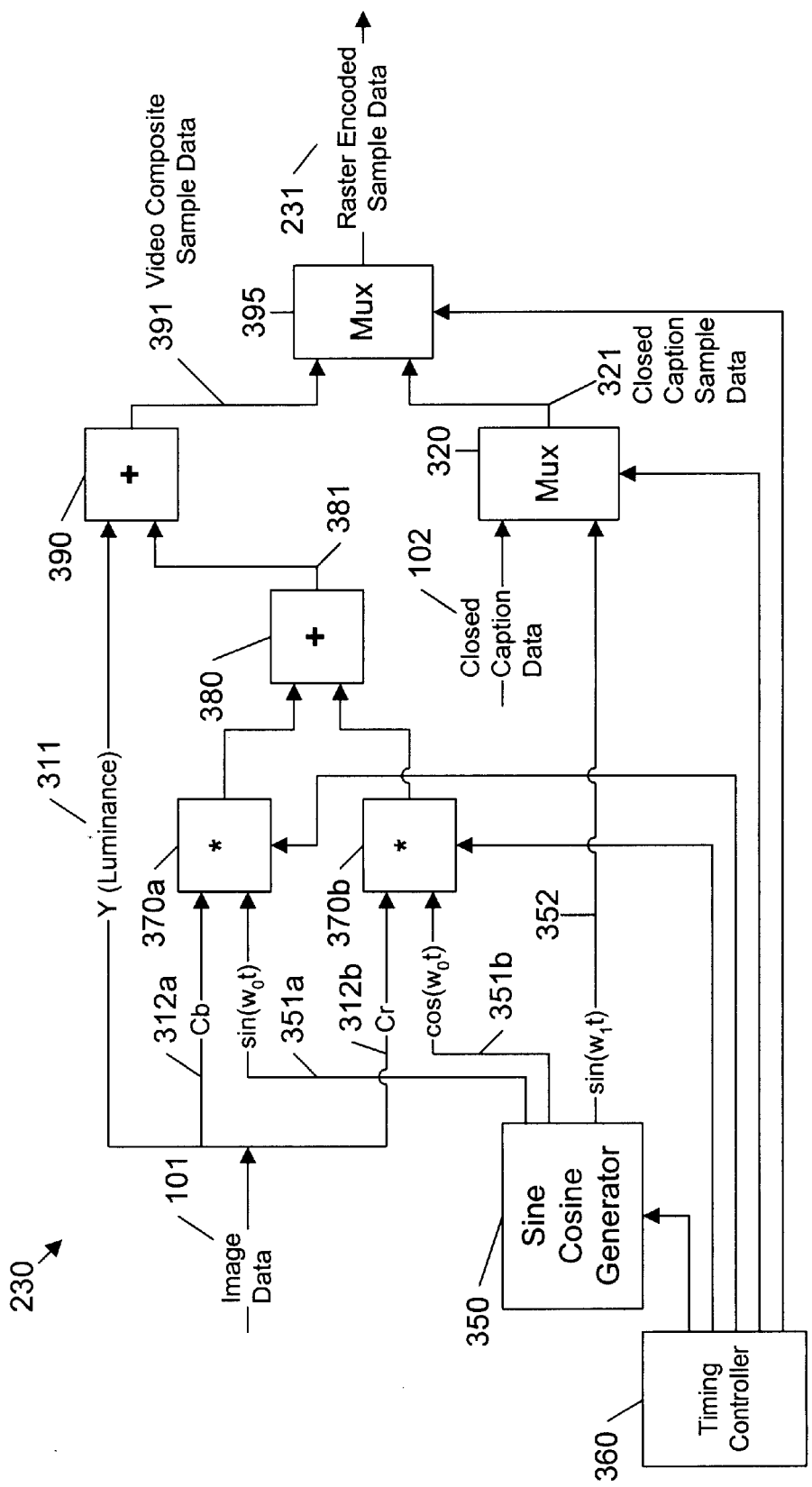
FIG. 3 illustrates an example block diagram of a video encoder in accordance with this invention.

FIG. 3 illustrates an example block diagram of the video encoder 230 in accordance with the present invention. The video encoder 230 includes a sine cosine generator 350, a timing controller 360, multipliers 370a and 370b, adders 380 and 390, and multiplexers 320 and 395. For clarity, the figures herein exclude those elements of a video encoder that are common in the art and not directly related to the encoding of image data or closed caption data into raster formatted data. FIG. 3 illustrates the encoding of image data 101 and closed caption data 102 into raster encoded sample data 231. The image data 101 in this example consists of three components: a luminance component and two chrominance components. Other formats of image data may also be utilized, and conversion processes to and from such forms, such as RGB and others, are common in the art. The chrominance components 312a, 312b of the image data 101 are quadrature-phase modulated about a subcarrier signal by the multipliers 370a and 370b. Multiplying each chrominance component 312a, 312b by the sine 351a and cosine 351b factors of the subcarrier signal, respectively, alters the quadrature-phase modulation. A sine cosine generator 350 generates the sine 351a and cosine 351b factors.

A timing controller 360, operating at the core clock frequency, synchronizes the generation of the sine 351a and cosine 351b factors corresponding to the phase of the subcarrier signal relative to the image data sample rate. By knowing the defined image data sample rate, a time can be associated with the occurrence of each data sample, and the value of the sine and cosine function of a continuous sinusoidal subcarrier signal can be mathematically determined at each of the times of occurrence of each data sample. An example of the control and generation of sine and cosine factors corresponding to a subcarrier signal relative to an image sample rate is presented in FIG. 4.

The adder 380 sums the modulated products of multipliers 370a and 370b to form the quadrature phase modulated chrominance signal 381. The adder 390 sums the luminance component 311 of the image data 101 with the quadrature phase modulated chrominance signal 381 to produce the video composite sample data 391. That is, the video composite sample data 391 is the luminance plus the modulated chrominance raster signal that is sampled at the image data sample rate.

The sine cosine generator 350 also produces oscillation samples 352 corresponding to the clock run in signal that is required for closed caption encoding. The multiplexer 320 forms the closed caption sample data 321 by selecting a specified number of oscillation samples 352, followed by samples of two bytes of the closed caption data 102. The timing controller 360 generates the appropriate control signals to effect this selection, based on the specified rasterization standards. Each sample of the closed caption sample data 321 corresponds to an oscillation sample 352 of the clock run in signal or a sample of the closed caption data 102 taken at the sample rate of the image data 101. That is, a continuous clock run in signal is not generated; rather, the oscillation samples 352 correspond, mathematically, to the value of a continuous clock run in signal that is sampled at the sample rate of the image data 101. A multiplexer 395 mixes the closed caption sample data 321 and the video composite sample data 391 to generate raster encoded sample data 231 by replacing the video composite sample data 391 with the closed caption sample data 321 at each time period corresponding to lines 21 and 284 in the raster encoded sample data 231.

Figure 4:
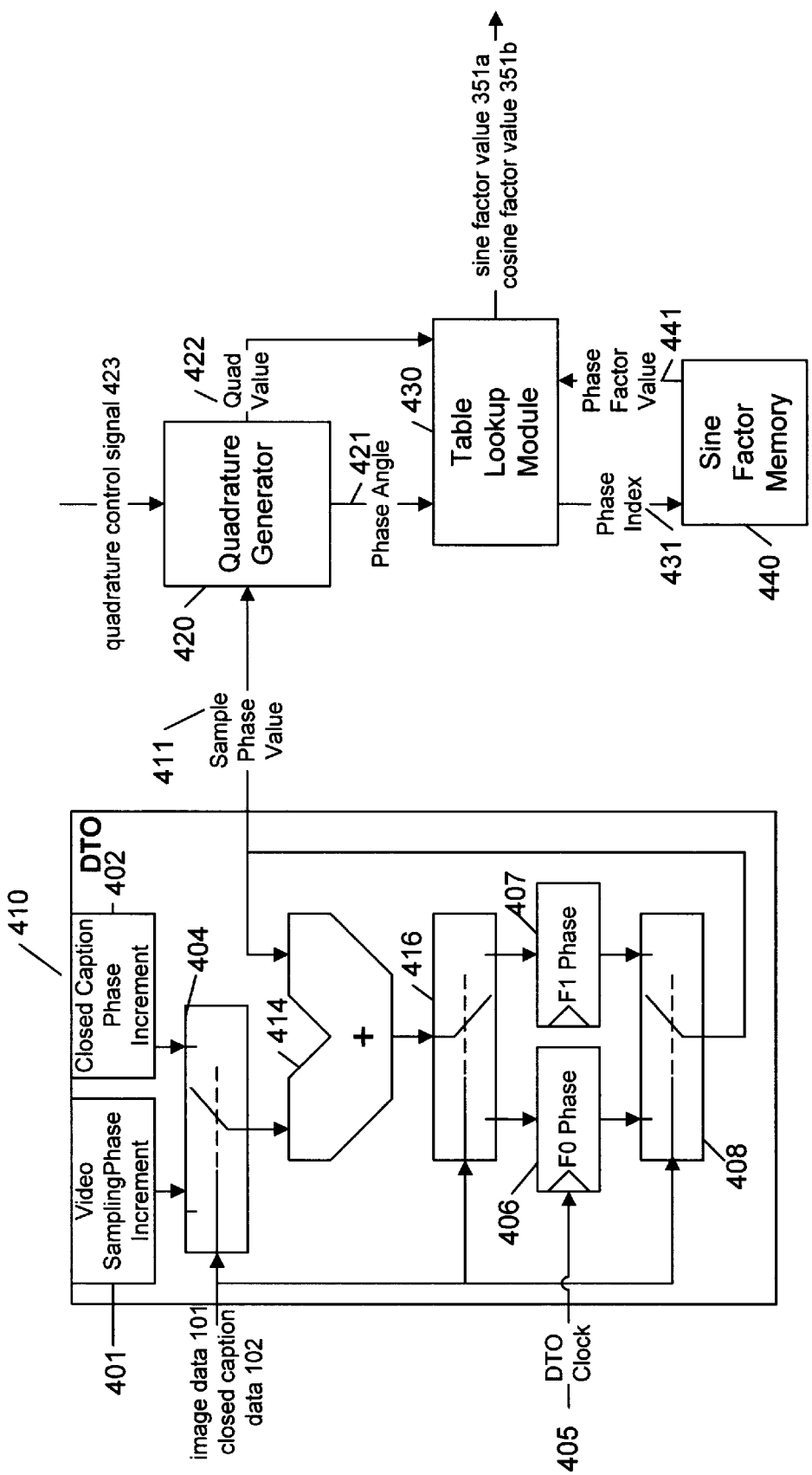
FIG. 4 illustrates an example block diagram of a discrete time oscillator (DTO) in accordance with this invention.

FIG. 4 illustrates a block diagram for a sine cosine generator 350 that includes a discrete time oscillator (DTO) 410, a quadrature generate or 420, a table lookup module 430, and a sine factor memory 440. The sine cosine generator 350 generates sine and cosine factor values 351a, 351b corresponding to the phase of a subcarrier signal relative to the image data sample rate. The DTO 410 includes a video sampling phase increment register 401, a closed caption phase increment register 402, multiplexers 404, 408, and 416, adder 414, and the accumulator registers 406 and 407. The timing controller 360 provides a DTO clock 405 to the DTO 410 that effects the generation of a sample phase value 411 of the chrominance subcarrier signal and the closed caption clock run in signal that corresponds to the time of each occurrence of each image data sample. The DTO 410 emulates the presence of a subcarrier signal that has a changing phase value relative to the occurrence of a sample clock by incrementing the registers 406 and 407 by a video sampling phase increment 401 and a closed caption phase increment 402. The DTO 410 generates a video sampling phase of the image data 101 during a first period of the DTO clock 405, and generates a closed caption phase of the closed caption data 102 during a second period of the DTO clock 405. Consider, for example, an image data sample rate of 13.5 MHz, and a subcarrier frequency of 3.58 MHz. The closed caption data rate is determined by the second DTO and individual bits of the closed caption data will be updated from a shift register every time the phase accumulator 407 overflows. Each data sample corresponds to samples taken at a 0.074074 microsecond (1/13.5 MHz) interval. In 0.074074 microseconds, the phase of a 3.58

MHz signal will advance by 1.665 radians (3.58 MHz * 2π* 0.074074 microseconds). Equivalently, the phase of the 3.58 MHz signal will advance by 0.265 cycles (3.58/13.5) at each occurrence of a data sample at 13.5 MHz. Therefore, if the DTO clock 405 corresponds to each sample of image data 101, and the video sampling phase increment register 401 contains a value that corresponds to 0.265 cycles, the contents of the register 406 will correspond to the phase value of a 3.58 MHz subcarrier signal at each occurrence of each sample of image data 101. By providing a video sampling phase increment 401 that is related to a full cycle, the integer value of the sum from the adder 414 is the number of cycles, and the fractional value is the phase angle within the current cycle. Registers 406 and 407 are configured to contain the fractional value only, thereby providing an ongoing measure of the phase angle, independent of the cycle number. In this example, the integer value of the sum from the adder 414 is ignored.

Figure 5:
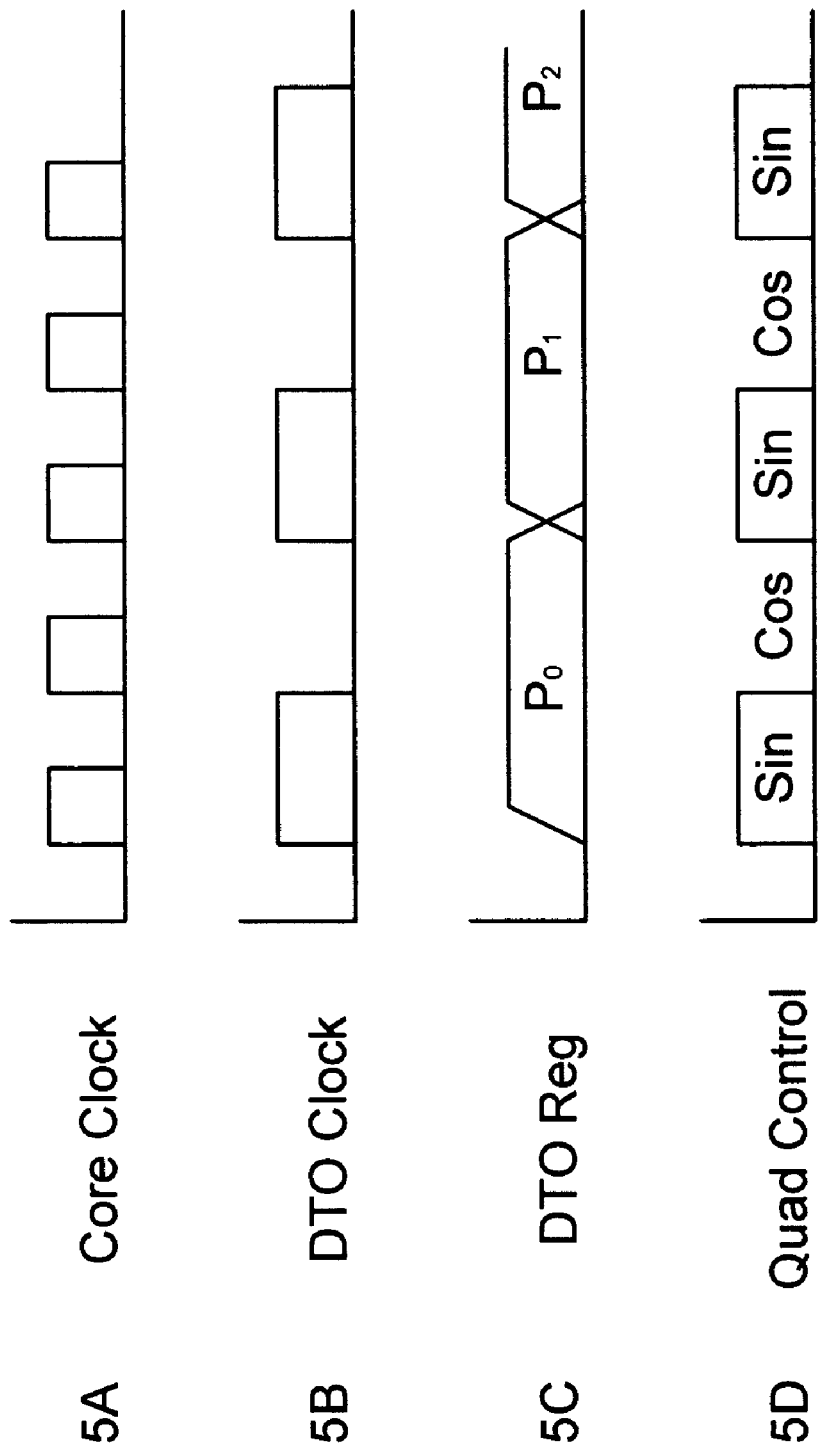
FIG. 5 illustrates an example timing diagram for a concurrent use of a discrete time oscillator in accordance with this invention.

Note that although the DTO clock 405 corresponds to each sample of image data 101, and each sample of image data 101 corresponds to a 13.5 MHz sampling of the image, the frequency of the DTO clock 405 is independent of the 13.5 MHz sampling rate. As illustrated on line 5B of FIG. 5, in the example embodiment of FIG. 4, the DTO clock 405 is operated at half the core clock frequency as illustrated on line 5A of FIG. 5 and is independent of the image data sampling rate.

Depending on the current operation mode of the DTO, as indicated by the input of the image data 101 and input of the closed caption data 102, the contents of the video sampling phase increment register 401 and the closed caption phase increment register 402, corresponding to the phase increment of the subcarrier per sample rate interval (13.5 MHz), are provided as one input to the adder 414 through the multiplexer 404. The other input receives the previous value of the corresponding accumulator registers 406 and 407 as a feedback through the multiplexer 408. In a preferred embodiment, for efficiency, the table lookup module 430 and sine factor memory 440 are configured to provide the sine of an angle. For storage size efficiency, the sine factor memory 440 contains the value of the sine function for phase angles between 0 and 90 degrees. The sample phase value 411 ranges from 0 to 360 degrees. The contents of either of the registers 406 and 407, respectively corresponding to the phase angle of the chrominance subcarrier signal and the closed caption clock run in signal at each occurrence of a sample of the image data, is provided as the sample phase value 411 to the quadrature generator 420, and is illustrated on line 5C of FIG. 5. The quadrature generator 420 transforms the actual sample phase value 411 (or the actual phase value 411 plus 90 degrees) to a phase angle between 0 and 90 degrees and a quadrature value that identifies with which quadrant the phase angle is associated. For example, if quadrature 0 includes angles between 0 degrees and 90 degrees, and quadrature 1 includes angles between 90 degrees and 180 degrees, the quadrature generator 420 transforms a sample phase value 411 of 98 degrees to a phase angle 421 of 82 degrees (180−98) and a quadrature value 422 of 1. The table lookup module 430 transforms the phase angle 421 into a phase index value 431 that indexes the sine factor memory 440 for the phase factor value 441 corresponding to the sine of the phase angle. In the example above, of a sample phase value of 98 degrees, the table lookup module 430 obtains the phase factor value 441 that is the sine of 82 degrees (180−98). Since the sine of an angle in quadrant 1 is equal to the sine of 180 degrees minus the angle, the table lookup provides the phase factor value 441 as the sine factor value 351*a* and the cosine factor value 351*b*. The lookup process for the cosine factor uses the same table, but with a different quadrature value, using the property: cos f=sin (f+90°). In another example, if quadrature 2 includes the angles between 180 degrees and 270 degrees, and the sample phase value 411 is 188 degrees, the quadrature generator 420 provides a phase angle value 421 of 8 degrees (188−180) and a quadrature value 422 of 2. The table lookup module 430 provides a phase index 431 corresponding to a phase angle 421 of 8 degrees to the sine factor memory 440, which thereby provides the phase factor value 441 corresponding to the sine of 8 degrees. Since the sine of an angle in quadrant 2 is equal to the negative of the sine of the angle less 180 degrees, the table lookup module 430 provides the negative of the phase factor value 441 as the sine factor value 351*a* and the cosine factor value 351*b*. Angles in quadrant 3, between 270 degrees and 360 degrees, are similarly processed by providing a phase angle 421 of 360 degrees minus the angle to the table lookup module 430, which negates the corresponding phase factor value 441 to provide the sine factor value 351*a* and the cosine factor value 351*b*.

Since the video encoder 230 operates at the core clock rate 5A, which is substantially higher that the image data sample rate at which the raster encoded sample data 231 is to be provided, the video encoder 230 is able to perform the processing of each chrominance component 312*a*, 312*b*, and each sine factor value 351 *a* and cosine factor value 351*b* of FIG. 3 sequentially in time. The timing controller 360 provides a quadrature control signal 423 that controls this sequential processing, illustrated on line 5D of FIG. 5. When the quadrature control signal 423 is asserted to signal the processing of the sine factor value 351*a*, the quadrature generator 420 operates as described above. When the quadrature control signal 423 is deasserted to signal the processing of the cosine factor value 351*b*, the quadrature generator 420 adds a 90 degree phase shift to the sample phase value 411 before the above processing is effected.

The present invention may be implemented in the form of a processing module coupled to memory having stored thereon programming instructions that, when read by the processing module, cause the processing module to perform various operations. In particular, the processing module, when executing the programming instructions, can concurrently receive image data and closed caption data; concurrently process the image data and the closed caption data to generate raster encoded sample data corresponding to at least one video sampling phase of a plurality of video sampling phases; convert the raster encoded sample data to an analog video and closed caption raster signal; and mix the analog video and closed caption raster signal with other raster signals to produce a raster television signal. The programming instructions may further cause the processing module to: generate sine factors and cosine factors of a subcarrier signal and generate oscillation samples corresponding to a clock run in signal; to multiply a chrominance component of the image data with at least one of the sine factors and multiply another chrominance component of the image data with at least one of the cosine factors to produce a quadrature-phase modulation product; and to sum the quadrature-phase modulation product to produce a quadrature-phase modulated chrominance signal and sum a luminance component of the image data with the quadrature-phase modulated chrominance signal to produce a video composite sample data. Additionally, the programming instructions may cause the processing module to: generate a clock signal and synchronize the generation of the sine factor and cosine factor corresponding to a phase of the subcarrier signal relative to a sample rate of the image data; to select and receive a specified number of the oscillation samples, samples of closed captioned data, and control signals from the timing controller to generate closed caption sample data corresponding to at least one closed caption sampling phase of a plurality of closed caption sampling phases and receive the video composite sample data, the closed caption sample data, and control signals from the timing controller to generate the raster encoded sample data. Further still, the programming instructions may cause the processing module to: generate a first phase value during a first period of the clock signal, and a second phase value during a second period of the clock signal, such that the first phase value corresponds to the at least one video sampling phase, and the second phase value corresponds to the at least one closed caption sampling phase; to receive the first phase value, the second phase value, and sine and cosine values to generate a quadrature value and a phase angle; and to select a video factor value of a plurality of factor values based on the at least one video sampling phase, select a closed caption factor value of the plurality of factor values based on the at least one closed caption sampling phase and generate the sine factor and cosine factor.

Thus, it is shown that by combining the processing of image data and closed caption data, a single discrete time oscillator (DTO) can be used to generate oscillation signals that are required for each process in the formation of a raster television signal. It should be understood that the implementation of other variations and modifications of the present invention in its various aspects will be apparent to those of ordinary skill in the art, and that the invention is not limited by the specific embodiments described. For example, the sine cosine generator 350 is presented herein using a table lookup approach, whereas algorithmic functions could be employed as well. Additionally, a combination of a relative small table lookup followed by an algorithmic interpolation for additional precision could be used. The video encoder 230 may be implemented in hardware, software, or a combination of both. For example, the video encoder 230 may be implemented as a set of instructions that control a digital signal processor. It is therefore contemplated to cover by the present invention, any and all modifications, variations, or equivalents that fall within the spirit and scope of the basic underlying principles disclosed and claimed herein.

What is claimed is:

1. A video encoding system comprising:
    a video encoder that concurrently receives and processes image data and closed caption data to generate raster encoded sample data corresponding to at least one video sampling phase of a plurality of video sampling phases;
    a digital to analog converter, operably coupled to the video encoder, that receives and converts the raster encoded sample data to an analog video and closed caption raster signal; and
    a synchronization control module, operably coupled to the digital to analog converter, that receives and mixes the analog video and closed caption raster signal with other raster signals to produce a raster television signal.

2. The video encoding system of claim 1, wherein the video encoder further comprises a discrete time oscillator that receives a clock signal and generates a first phase value during a first period of the clock signal and a second phase value during a second period of the clock signal to facilitate the concurrent processing of image data and closed caption data.

3. The video encoding system of claim 2, wherein the first phase value corresponds to the at least one video sampling phase, and the second phase value corresponds to at least one closed caption sampling phase.

4. The video encoding system of claim 3, wherein the video encoder further comprises a sine cosine generator that generates sine factors and cosine factors of a subcarrier signal and generates oscillation samples corresponding to a clock run in signal.

5. The video encoding system of claim 4, wherein the video encoder further comprises:
    a plurality of multipliers, wherein at least one of the plurality of multipliers multiplies a chrominance component of the image data with at least one of the sine factors; and
    wherein at least another one of the plurality of multipliers multiplies another chrominance component of the image data with at least one of the cosine factors to produce a quadrature-phase modulation product.

6. The video encoding system of claim 5, wherein the video encoder further comprises:
    a plurality of adders, wherein at least one of the plurality of adders sums the quadrature-phase modulation product from the plurality of multiplier to produce a quadrature-phase modulated chrominance signal; and
    wherein at least another one of the plurality of adders sums a luminance component of the image data with the quadrature-phase modulated chrominance signal to produce a video composite sample data.

7. The video encoding system of claim 6, wherein the video encoder further comprises a timing controller that generates the clock signal and synchronizes the generation of the sine factor and cosine factor corresponding to a phase of the subcarrier signal relative to a sample rate of the image data.

8. The video encoding system of claim 7, wherein the video encoder further comprises:
    a plurality of multiplexers, wherein at least one of the plurality of multiplexers selects and receives a specified number of the oscillation samples, samples of closed captioned data, and control signals from the timing controller to generate closed caption sample data corresponding to the at least one closed caption sampling phase of a plurality of closed caption sampling phases; and
    another one of the plurality of multiplexers receives the video composite sample data, the closed caption sample data, and control signals from the timing controller to generate the raster encoded sample data.

9. The video encoding system of claim 8 further comprises at least one sample of the closed caption sample data that corresponds to an oscillation sample of the clock run in signal.

10. The video encoding system of claim 8 further comprises at least one sample of the closed caption sample data that corresponds to a sample of the closed captioned data taken at the sample rate of the image data.

11. The video encoding system of claim 8 further comprises a multiplexer which replaces the video composite sample data with the closed caption sample data at each time period corresponding to lines 21 and 284 in the raster encoded sample data.

12. The video encoding system of claim 4, wherein the sine cosine generator further comprises a quadrature generator, operably coupled to the discrete time oscillator, that receives the first phase value, the second phase value, and sine and cosine values to generate a quadrature value and a phase angle.

13. The video encoding system of claim 9, wherein the sine cosine generator further comprises a factor memory that contains a plurality of factor values.

14. The video encoding system of claim 13, wherein the sine cosine generator further comprises a table lookup module, operably coupled to the quadrature generator and the factor memory, that:

selects a video factor value of the plurality of factor values based on the at least one video sampling phase;

selects a closed caption factor value of the plurality of factor values based on the at least one closed caption sampling phase; and generates the sine factor and cosine factor.

15. The video encoding system of claim 14 wherein the raster encoded sample data is based upon the video factor value.

16. The video encoding system of claim 14 wherein the closed caption sample data is based upon the closed caption factor value.

17. A method for video encoding, the method comprises the steps of:

a) concurrently receiving image data and closed caption data;

b) concurrently processing the image data and the closed caption data to generate raster encoded sample data corresponding to at least one video sampling phase of a plurality of video sampling phases;

c) converting the raster encoded sample data to an analog video and closed caption raster signal; and d) mixing the analog video and closed caption raster signal with other raster signals to produce a raster television signal.

18. The method of claim 17, wherein the step of concurrently processing further comprises:

generating sine factors and cosine factors of a subcarrier signal; and generating oscillation samples corresponding to a clock run in signal based on the concurrently received image data and closed caption data.

19. The method of claim 18, wherein the step of concurrently processing further comprises:

multiplying a chrominance component of the image data with at least one of the sine factors; and multiplying another chrominance component of the image data with at least one of the cosine factors to produce a quadrature-phase modulation product.

20. The method of claim 19, wherein the step of concurrently processing further comprises:

summing the quadrature-phase modulation product to produce a quadrature-phase modulated chrominance signal; and summing a luminance component of the image data with the quadrature-phase modulated chrominance signal to produce a video composite sample data.

21. The method of claim 20, wherein the step of concurrently processing further comprises:

selecting and receiving a specified number of the oscillation samples, samples of closed captioned data, and control signals from a timing controller to generate closed caption sample data corresponding to at least one closed caption sampling phase of a plurality of closed caption sampling phases; and receiving the video composite sample data, the closed caption sample data, and control signals from the timing controller to generate the raster encoded sample data.

22. The method of claim 21, wherein the step of concurrently processing further comprises generating a first phase value during a first period of the clock signal, and a second phase value during a second period of the clock signal, such that the first phase value corresponds to the at least one video sampling phase, and the second phase value corresponds to the at least one closed caption sampling phase.

23. The method of claim 22, wherein the step of concurrently processing further comprises receiving the first phase value, the second phase value, and sine and cosine values to generate a quadrature value and a phase angle.

24. The method of claim 21, wherein the step of concurrently processing further comprises:

selecting a video factor value of a plurality of factor values based on the at least one video sampling phase;

selecting a closed caption factor value of the plurality of factor values based on the at least one closed caption sampling phase; and generating the sine factor and cosine factor.

25. The method of claim 19, wherein the step of concurrently processing further comprises:

generating a clock signal; and synchronizing the generation of the sine factor and cosine factor corresponding to a phase of the subcarrier signal relative to a sample rate of the image data.

* * * * *